United States Patent
Kandukuri et al.

(10) Patent No.: US 12,386,840 B2
(45) Date of Patent: *Aug. 12, 2025

(54) DYNAMIC QUERY ALLOCATION TO VIRTUAL WAREHOUSES

(71) Applicant: Capital One Services, LLC, McLean, VA (US)

(72) Inventors: Praveen Kandukuri, Ashburn, VA (US); Syed Shamaz Salim, North Potomac, MD (US); Karamchandradatt Hardatt, Glen Allen, VA (US); Nagender Gurram, Glen Allen, VA (US); Ganesh Bharathan, Henrico, VA (US); Yudhish Batra, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,260

(22) Filed: Apr. 27, 2023

(65) Prior Publication Data

US 2023/0267125 A1    Aug. 24, 2023

Related U.S. Application Data

(63) Continuation of application No. 17/374,325, filed on Jul. 13, 2021, now Pat. No. 11,669,529.

(51) Int. Cl.
*G06F 17/00* (2019.01)
*G06F 9/50* (2006.01)
(Continued)

(52) U.S. Cl.
CPC ...... *G06F 16/24575* (2019.01); *G06F 9/5005* (2013.01); *G06F 16/256* (2019.01); *G06N 20/00* (2019.01)

(58) Field of Classification Search
CPC ............. G06F 16/24575; G06F 16/256; G06F 16/283; G06F 9/5005; G06N 20/00
See application file for complete search history.

(56) References Cited

U.S. PATENT DOCUMENTS 10,133,775 B1  11/2018 Ramalingam et al.
10,515,119 B2  12/2019 Kirk et al.
(Continued)

OTHER PUBLICATIONS

Nadilytics—The Intelligence Platform on top of Snowflake. Retreived from https://www.nadilytics.com/, retrieved online May 14, 2021, at 4:25:15 pm.
(Continued)

*Primary Examiner* — Greta L Robinson
(74) *Attorney, Agent, or Firm* — Banner & Witcoff, Ltd.

(57) ABSTRACT

Methods, systems, and apparatuses for managing and selecting virtual warehouses for execution of queries on one or more data warehouses are described herein. A request to execute a query may be received. An execution plan, for the query, may be identified. A processing complexity for the query may be predicted based on the query and the execution plan. A plurality of virtual warehouses may be identified. An operating status and processing capabilities of the plurality of virtual warehouses may be determined. A subset of the plurality of virtual warehouses may be selected based on the processing complexity, the operating status of the plurality of virtual warehouses, and the processing capabilities of the plurality of virtual warehouses. The query may be executed on one of the subset of the plurality of virtual warehouses.

20 Claims, 8 Drawing Sheets

(51) Int. Cl.
  *G06F 16/2457* (2019.01)
  *G06F 16/25* (2019.01)
  *G06N 20/00* (2019.01)

(56) References Cited

U.S. PATENT DOCUMENTS

| | | | |
|---|---|---|---|
| 10,776,391 | B1 | 9/2020 | Cruanes et al. |
| 10,970,303 | B1 | 4/2021 | Denton et al. |
| 11,048,716 | B1 | 6/2021 | Cseri et al. |
| 11,194,815 | B1 | 12/2021 | Kumar et al. |
| 11,314,741 | B2 | 4/2022 | Marcel et al. |
| 11,327,970 | B1 | 5/2022 | Li et al. |
| 11,494,413 | B1 | 11/2022 | Kandukuri et al. |
| 11,669,529 | B2 | 6/2023 | Kandukuri et al. |
| 11,734,304 | B2 | 8/2023 | Cruanes et al. |
| 11,775,584 | B1 | 10/2023 | Sharma |
| 11,880,364 | B2 | 1/2024 | Jiang et al. |
| 11,914,595 | B2 * | 2/2024 | Kandukuri ........ G06F 16/24545 |
| 2006/0095440 | A1 | 5/2006 | Dettinger et al. |
| 2009/0254916 | A1 | 10/2009 | Bose et al. |
| 2012/0131591 | A1 | 5/2012 | Moorthi et al. |
| 2012/0173515 | A1 | 7/2012 | Jeong et al. |
| 2013/0117305 | A1 | 5/2013 | Varakin et al. |
| 2014/0006384 | A1 | 1/2014 | Jerzak et al. |
| 2014/0089495 | A1 | 3/2014 | Akolkar et al. |
| 2017/0316007 | A1 | 11/2017 | Vandenberg et al. |
| 2017/0316078 | A1 * | 11/2017 | Funke ................. H04L 67/1008 |
| 2018/0032574 | A1 | 2/2018 | Vandenberg |
| 2018/0121426 | A1 | 5/2018 | Barsness et al. |
| 2018/0173758 | A1 | 6/2018 | Barsness et al. |
| 2019/0042126 | A1 | 2/2019 | Sen et al. |
| 2019/0324964 | A1 | 10/2019 | Shiran et al. |
| 2020/0219028 | A1 | 7/2020 | Papaemmanouil et al. |
| 2020/0264928 | A1 | 8/2020 | Kalmuk et al. |
| 2020/0349161 | A1 | 11/2020 | Siddiqui et al. |
| 2020/0409949 | A1 | 12/2020 | Saxena et al. |
| 2021/0089560 | A1 | 3/2021 | Funke et al. |
| 2021/0279209 | A1 | 9/2021 | Cseri et al. |
| 2021/0334283 | A1 | 10/2021 | Gladwin et al. |

OTHER PUBLICATIONS

Snowflake for Data Sharing, Snowflake Workloads, <<https://www.snowflake.com/workloads/data-sharing/>>, date of publication unknown but, prior to Jul. 13, 2021, 3 pages, published Aug. 2020.
Data Governance is Worth the Time and Trouble, <<https://www.snowflake.com/trending/data-governance-framework>>, date of publication unknown but, prior to Jul. 13, 2021, 14 pages.
Working with Secuve Views, Snowflake Documention, <<https://docs.snowflake.com/en/user-guide/views-secure.html>>, date of publication unknown but, prior to Jul. 13, 2021, 3 pages, published Aug. 2020.
Data governance with Snowflake: 3 things you need to know, <<https://www.talend.com/resources/data-governance-snowflake-3-things-to-know/, date of publication unknown but, prior to Jul. 13, 2021, 11 pages.
GPDR: A quick way to reduce scope, <<https://www.talend.com/resources/anonymize-data/>>, date of publication unknown but, prior to Jul. 13, 2021, 6 pages.
Jun. 14, 2019, Mushtaq, Data preprocessing in detail, <<https://developer.ibm.com/technologies/data-science/articles/data-preprocessing-in-detail/>>, 9 pages.
Wikipedia, Data pre-processing, <<https://en.wikipedia.org/wiki/Data_pre-processing>>, date of publication but, prior to Jul. 13, 2021, 4 pages.
Snowflake Data Exchange, <<https://resources.snowflake.com/solution-briefs/data-exchange-solution-brief>>, date of publication unknown but, prior to Jul. 13, 2021, 2 pages.
Aug. 16, 2021, VentureBeat, Lazzaro, "How to migrate to Snowflake without getting 'data drunk'," <<https://venturebeat.com/2021/08/16/how-to-migrate-to-snowflake-without-getting-data-drunk/>>, 8 pages.
Zhao, et al., "SLA-based Profit Optimization Resource Scheduling for Big Data Analytics-as-a-Service Platforms in Cloud Computing Environments," IEEE Transactions on Cloud Computing, Dec. 27, 2018.
Wided Mathlouthi, et al. "Agent-based modeling and simulation of pooled warehouse intelligent management" In Proceedings of the Conference on Summer Computer Simulation. Society for Computer Simulation International, San Diego, CA, USA pp. 1-8, Year 2015.
Benoit Dageville et al., "The Snowflake Elastic Data Warehouse" In Proceedings of the 2016 International Conference on Management of Data (SIGMOD '16) Association for Computing Machinery, website: <https://doi.org/10.1145/2882903.2903741>, pp. 215-226, Jun. 2016.
Getta J R et al., "Optimizing Global Query Processing Plans in Heterogeneous and Distributed Multidatabase Systems" Database and Expert Sytems Applications, 1999. Proceedings. Tenth International Workshop on Florence, Italy Sep. 1-3, 1999, IEEE Comput, XP010352382, pp. 12-16.
Oct. 26, 2022—(WO) Invitation to Pay Additional Fees and Partial International Search Report—App No. PCT/US2022/036658.
Jul. 15, 2022, Notice of Allowance of U.S. Appl. No. 17/374,479.
Snowflake for Data Sharing, Snowflake Workloads, <https://www.snowflake.com/workloads/data-sharing/>>, date of publication unknown but, prior to Jul. 13, 2021, 5 pages, published Aug. 2020.
Working with Secure Views, Snowflake Documention, <<https://docs.snowflake.com/en/user-guide/views-secure.html>>, date of publication unknown but, prior to Jul. 13, 2021, 7 pages, published Aug. 2020.

* cited by examiner

FIG. 5A

| Step | Task | DB Size | Est. Results Size |
|---|---|---|---|
| 1 | Query Table 1 of Data Warehouse A | 5 GB | 2 GB |
| 2 | Query Table 2 of Data Warehouse A using Results from Step 1 | 15 GB | 1 GB |
| 3 | Query Table 1 of Data Warehouse B using Results from Step 2 | 1 GB | 20 MB |
| 4 | Query Table 2 of Data Warehouse B | 10 GB | 5 GB |
| 5 | Associate Results from Steps 1-4 | N/A | 7 GB |

| step | id | parent | operation | objects | alias | expressions | partitionsTotal | partitionsAssigned | bytesAssigned |
|---|---|---|---|---|---|---|---|---|---|
| NULL | NULL | NULL | GlobalStats | NULL | NULL | | 3599187 | 143289 | 216920784896 |
| 1 | 0 | NULL | Result | NULL | NULL | | NULL | NULL | NULL |
| 1 | 1 | 0 | Filter | NULL | NULL | | NULL | NULL | NULL |
| 1 | 2 | 1 | WindowFunction | NULL | NULL | | NULL | NULL | NULL |
| 1 | 3 | 2 | LeftOuterJoin | NULL | NULL | | NULL | NULL | NULL |
| 1 | 4 | 3 | Filter | NULL | NULL | | NULL | NULL | NULL |
| 1 | 5 | 4 | TableScan | BARC_DB_C | 0 | | 779 | 779 | 18663591184 |
| 1 | 6 | 3 | LeftOuterJoin | NULL | NULL | | NULL | NULL | NULL |
| 1 | 7 | 6 | LeftOuterJoin | NULL | NULL | | NULL | NULL | NULL |
| 1 | 8 | 7 | Filter | NULL | NULL | | NULL | NULL | NULL |
| 1 | 9 | 8 | TableScan | PEDW_M | A | | 2474042 | 18064 | 29017740953 |
| 1 | 10 | 7 | Filter | BARC_DB_C | NULL | | 2071 | 2071 | 92289364992 |
| 1 | 11 | 10 | TableScan | NULL | NULL | | NULL | NULL | NULL |
| 1 | 12 | 11 | JoinFilter | NULL | NULL | | NULL | NULL | NULL |
| 1 | 13 | 12 | TableScan | PEDW_M | NULL | | 122295 | 122295 | 18669531532 |

506

Recent Query Information

| | | |
|---|---|---|
| Department A | 5 TB<br>30 Hours | $500 |
| Department B | 15 TB<br>50 Hours | $1500 |
| Department C | 150 TB<br>50 Hours | $20,000 |

WARNING

The query you have requested is estimated to take an unexpected amount of time:
Time to Complete:   3 Hours
Estimated Cost:   $5,000

Are you sure you want to proceed with this query?

| Yes, Proceed with Query | Alternative Query Recommendations | Cancel Query |
|---|---|---|

DYNAMIC QUERY ALLOCATION TO VIRTUAL WAREHOUSES

CROSS REFERENCE TO RELATED APPLICATIONS

This application is a continuation of U.S. patent application Ser. No. 17/374,325 filed Jul. 13, 2021, titled Dynamic Query Allocation to Virtual Warehouses. The contents of the above listed application is expressly incorporated herein by reference in its entirety for any and all non-limiting purposes.

FIELD OF USE

Aspects of the disclosure relate generally to data storage and retrieval. More specifically, aspects of the disclosure relate to managing virtual warehouses which execute queries with respect to a plurality of data warehouses.

BACKGROUND

The Snowflake architecture, produced by Snowflake Inc. of San Mateo, CA, permits organizations to logically separate but natively integrate storage, computing, and services. Given the complexity and size of many data warehouses, the task of executing queries and collecting the results of those queries is often tasked to computing devices specially configured for that purpose. Such computing devices may be, as is the case with Snowflake, one or more servers which may instantiate virtual warehouses for a user to conduct searches within. Snowflake and similar "data warehouse as a service" platforms may thereby allow users and companies to offload complex and expensive data warehousing and query operations to a cloud provider. For example, a user seeking to query a multi-terabyte data warehouse may, rather than trying to execute the query and collect results on their laptop, send instructions to a virtual warehouse in the cloud that causes one or more servers to, via a virtual warehouse, perform the query on their behalf. This allows the user to access the results of the data (e.g., in a user interface) from a relatively underpowered computing device. As such, systems like Snowflake have numerous benefits: they lower the processing burden on individual users' computers when conducting queries, they lower the network bandwidth required for such queries (as, after all, data need not be downloaded to the user's computer), and they (in many cases) speed up the overall query process significantly.

In addition to avoiding resource limitations associated with queries, another advantage of the Snowflake architecture is that it allows users to collect data in a way that is resilient. Because a user's laptop might be relatively underpowered, queries that request significant amounts of data might crash the laptop. Moreover, because a single device collects the results of a query, unexpected technical issues (e.g., power loss, Internet disconnects) might cause the entire query to fail. The Snowflake architecture is equipped with built-in replication and failover/failback procedures which avoid such crashes, thereby ensuring that data continuity may be preserved. That said, such robustness can come with a caveat: because the Snowflake architecture can handle larger and more robust queries, a user might submit a malformed or overly broad query and thereby inadvertently cause a virtual warehouse to spend considerable time and computing resources.

One way in which the Snowflake architecture improves conventional query execution is that Snowflake allows virtual warehouses to be created and destroyed as desired. This allows multiple queries to be executed simultaneously but separately. For example, the Snowflake architecture allows a first user from an organization to execute a first query in a first virtual warehouse at the same that a second user from the same organization executes a second query in a second virtual warehouse. To preserve computing resources, the different virtual warehouses might be configured to be different sizes. For example, a virtual warehouse for large, significant, and/or time-sensitive queries might be larger than a virtual warehouse for relatively smaller, less significant, and/or more time-insensitive queries.

Moreover, because the Snowflake architecture provides virtual warehouses as a service (e.g., in the cloud), user error and poor query formatting can be particularly costly. In particular, because virtual warehouse providers often charge for the use of virtual warehouses (e.g., cost as a function of time, computing resources used, or some combination thereof), a user may inadvertently input a poorly-formatted query that costs hundreds of dollars to execute. For example, a user may inadvertently include a wildcard in a query that causes a Snowflake virtual warehouse to query a large number of data warehouses, needlessly running up the cost of the query. Moreover, because some virtual warehouse providers like Snowflake allow users to open and maintain virtual warehouses as needed, queries may be executed on excessively large and/or excessively small workspaces, which can cost an organization both time and money. For example, a user may inadvertently cause a significant query to be executed on a small virtual warehouse, causing the query to take hours to complete. As another example, a user may cause a relatively small but recurring query to be executed by an excessively large virtual warehouse, occupying that virtual warehouse such that larger, more serious queries designed for that virtual warehouse may be delayed.

Aspects described herein may address these and other problems, and generally improve the quality, efficiency, and speed of the management of virtual warehouses as those workspaces are tasked with queries.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to dynamically managing and allocating queries to virtual warehouses based on, among other considerations, a processing complexity of received queries. Such a process may be performed on a Snowflake environment or a similar environment whereby virtual warehouses are used to execute queries with respect to data warehouses. Users of an organization may provide a variety of requests for queries to be executed on one or more of a plurality of data warehouses. For example, such a request may comprise a plurality of Structured Query Language (SQL) compliant search queries intended to search one or more tables in a data warehouse. An execution plan may be identified for a request. Such an execution plan may indicate, for example, one or more sub-queries to be executed with respect to one or more of the plurality of data warehouses. For instance, to fulfill a particular request, a virtual warehouse may need to execute ten different subqueries in a particular sequence, with later queries reliant on the output from earlier queries. As such, the execution plan may indicate a processing complexity of the query. Then, based on that execution plan, a subset of a plurality of available virtual warehouses may be selected. Even though each of these virtual warehouses may be capable of handling the query (e.g., with varying degrees of speed, at varying costs, or the like), a subset of a plurality of virtual warehouses may be selected based on, for example, the processing complexity of the query (e.g., how long the query is likely to take to execute), the operating status of each of the plurality of virtual warehouses (e.g., whether each is busy or free), the processing capabilities of the plurality of virtual warehouses (e.g., how much memory has been allocated to each virtual warehouse), and the like. From that subset of the plurality of virtual warehouses, a first virtual warehouse may execute the requested query. In this manner, the query may be allocated to a virtual warehouse that is best positioned to fulfill the query.

Aspects described herein also relate to generating a user interface comprising query cost information corresponding to an organization, such as a department of a company that uses the Snowflake environment. In this manner, an organization may be able to track how different organizations' use of virtual warehouses contributes to the overall utilization and expenditure for those virtual warehouses. A request to execute a query on at least one of a plurality of data warehouses may be received from a user device. A computing device may determine an organization associated with a user of the user device. For example, the user may be part of an accounting department, a marketing department, or the like. The computing device may modify the query by adding, to a metadata field of the query, an indication of the organization. For example, the metadata field may be a comments field of the query. The computing device may identify a plurality of virtual warehouses. Each of the plurality of virtual warehouses may comprise a respective set of computing resources configured to execute one or more queries with respect to at least a portion of the plurality of data warehouses, collect results from the one or more queries, and provide, to the user device, access to the collected results. The computing device may cause a first virtual warehouse of the plurality of virtual warehouses to execute the query. The computing device may receive, based on execution of the query by the first virtual warehouse, query results and costs data that indicates one or more costs associated with execution of the query by the first warehouse. The computing device may extract the indication of the organization from the metadata field in the query results. In this manner, the computing device may determine that the query results are associated with the organization. The computing device may then generate, based on the costs data and the extracted indication of the organization in the metadata field of the query results, a user interface comprising query cost information corresponding to the organization. That user interface may indicate, for example, a total cost of various queries submitted by the organization.

Aspects described herein also relate to generating notifications regarding queries provided for execution using virtual warehouses. As indicated above, users may provide queries that cost a significant amount of money, may take an undesirable amount of time, or the like. As such, a system may be configured to generate a notification associated with execution of a query and permit the user to take certain steps based on the notification, such as selecting a particular virtual warehouse to execute the query, modifying the query (to, e.g., make it easier to process), canceling the query, or the like. A computing device may receive, from a user device, a request to execute a query on at least one of a plurality of data warehouses. The computing device may identify an execution plan for the query by determining one or more sub-queries to be executed with respect to one or more of the plurality of data warehouses. The computing device may predict a processing complexity of the query and generate, based on the processing complexity meeting an alert threshold, a notification associated with execution of the query. The notification may relate to, for example, a cost of the query, a time to complete the query, a possible error in the query, or the like. The computing device may then cause the user device to display the notification. The computing device may receive, from the user device, a response to the notification comprising a selection of a first virtual warehouse, of a plurality of virtual warehouses, to execute the query. For example, the response may indicate that a user is willing to assume the time/cost for the query, and may select a particular virtual warehouse to begin executing the query.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 5A shows an illustrative execution plan.

FIG. 5B shows an illustrative execution plan with additional operational detail.

FIG. 6 shows a user interface indicating the size and cost of queries executed, using virtual warehouses, by various departments of an organization.

FIG. 7 shows a user interface indicating a warning regarding the time and cost of executing, by a virtual warehouse, a query.

DETAILED DESCRIPTION

Figure 1:
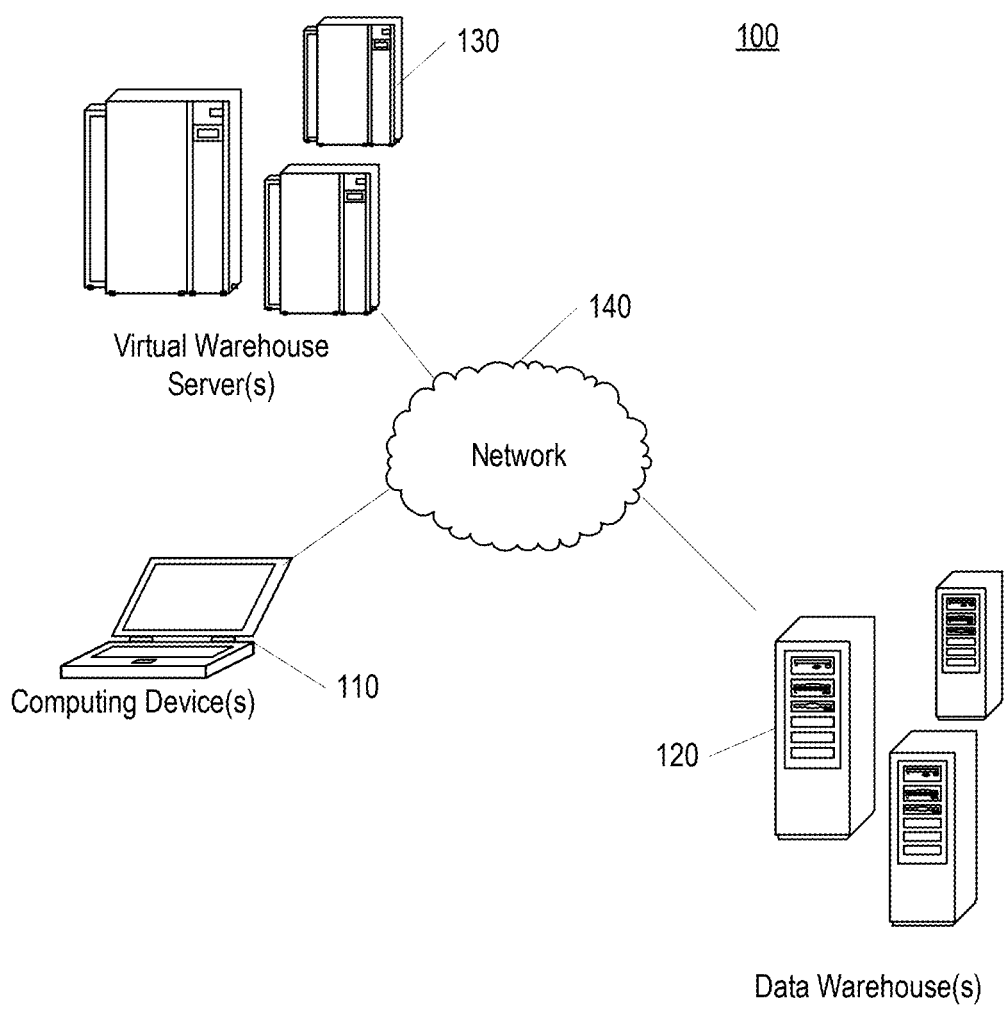
FIG. 1 shows an example of a system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for management of virtual warehouses which execute queries with respect to one or more data warehouses. A virtual warehouse may comprise one or more computing devices which are configured to perform tasks associated with one or more queries, such as executing the one or more queries with respect to one or more data warehouses, collecting results from those one or more queries (e.g., from the one or more data warehouses), and providing those collected results to one or more user devices. For example, three virtual warehouses may be instantiated on a single computing device (e.g., a server), a plurality of computing devices (e.g., a distributed network of servers), or the like. The availability of and/or use of a virtual warehouse may be associated with cost. For example, an organization may be charged based on a time in which a virtual warehouse is used, the size of a query, the amount of memory used by a query, or the like. Accordingly, virtual warehouses may be limited in their size (that is, the amount of computing resources available to them). For example, for simple queries, a virtual warehouse may be instantiated with a relatively small quantity of computing resources (e.g., processor speed, memory) so as to lower the cost of maintaining and using that virtual warehouse. Moreover, multiple virtual warehouses may be available to an organization. For example, an organization may maintain a large virtual warehouse for significant and business-critical queries, whereas it may maintain a plurality of smaller virtual warehouses for more routine and less time-sensitive queries.

Systems as described herein may include apportioning queries to one of a plurality of virtual warehouses based on considerations such as, for example, the processing complexity of a query, the operating status of each of the plurality of virtual warehouses, the processing capabilities of each of the plurality of virtual warehouses, and the like. In this manner, queries may be dynamically allocated to subsets of a plurality of available virtual warehouses, thereby preserving computing resources and lowering costs.

The present disclosure is significantly different than conventional query systems at least in that it operates in view of the particularities and needs of virtual warehouses. The present system is significantly more than the mere allocation of a query to an appropriate data warehouse: rather, the present system analyzes available virtual warehouses to determine how a query may be best apportioned to those virtual warehouses, particularly in view of the unique operating conditions and limitations of those virtual warehouses. For example, because virtual warehouses are instantiated on one or more computing devices, the computing resources available to one or more virtual warehouses may be modified to, e.g., speed up a query for an additional cost. As another example, because virtual warehouses may receive a different frequency of queries at a different time of day, the size of a virtual warehouse may be modified to save costs at the expense of off-peak query speed.

The present disclosure also improves the functioning of computers by improving the manner in which queries are executed with respect to one or more data warehouses. Virtual warehouses provide an improvement to conventional query systems, but their misconfiguration and misuse can result in the waste of computing resources. As such, improvements to the manner in which queries are received by virtual warehouses may make those virtual warehouses more efficient. For example, by avoiding allocating queries to overburdened virtual warehouses, the overall speed of queries may be improved, and data may thereby be collected and provided to users more quickly.

FIG. 1 shows a system 100. The system 100 may include one or more computing devices 110, one or more data warehouses 120, and/or one or more virtual warehouse servers 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The computing devices 110 may, for example, provide queries to the virtual warehouse servers 130 and/or receive query results from the virtual warehouse servers 130, as described herein. The data warehouses 120 may store data and provide, in response to queries, all or portions of the stored data, as described herein. The data warehouses 120 may include, but are not limited to relational databases, hierarchical databases, distributed databases, in-memory databases, flat file databases, XML databases, NoSQL databases, graph databases, and/or a combination thereof. The virtual warehouse servers 130 may execute, manage, resize, and otherwise control one or more virtual warehouses, as described herein. Thus, for example, one or more of the computing devices 110 may send a request to execute a query to one or more of the virtual warehouse servers 130, and one or more virtual warehouses of the virtual warehouse servers 130 may perform steps which effectuate that query with respect to one or more of the data warehouses 120. The network 140 may include a local area network (LAN), a wide area network (WAN), a wireless telecommunications network, and/or any other communication network or combination thereof.

The virtual warehouse servers 130 and/or the data warehouses 120 may be all or portions of a cloud system. In this manner, the computing devices 110 might be located in a first location (e.g., the offices of a corporation), and the virtual warehouse servers 130 and/or the data warehouses 120 might be located in a variety of locations (e.g., distributed in a redundant manner across the globe). This might protect business resources: for example, if the Internet goes down in a first location, the distribution and redundancy of various devices might allow a business to continue operating despite the outage.

The virtual warehouse servers 130 may be all or portions of a virtual warehouse as a service system, such as is provided via the Snowflake architecture. For example, the computing devices 110 and/or the data warehouses 120 might be managed by an organization. In contrast, the virtual warehouse servers 130 might be managed by a different entity, such as Snowflake Inc. In this manner, a third party (e.g., Snowflake) might provide, as a service, virtual warehouses which might operate on behalf of organization-managed computing devices (e.g., the computing device 110) to perform queries with respect to organization-managed data warehouses (e.g., the data warehouses 120).

As used herein, a data warehouse, such as any one of the data warehouses 120, may be one or more databases or other devices which store data. For example, a data warehouse might be a single database, a collection of databases, or the like. A data warehouse might be structured and/or unstructured, such that, for example, a data warehouse might comprise a data lake. A data warehouse might store data in a variety of formats and in a variety of manners. For example, a data warehouse might comprise textual data in a table, image data as stored in various file system folders, and the like.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
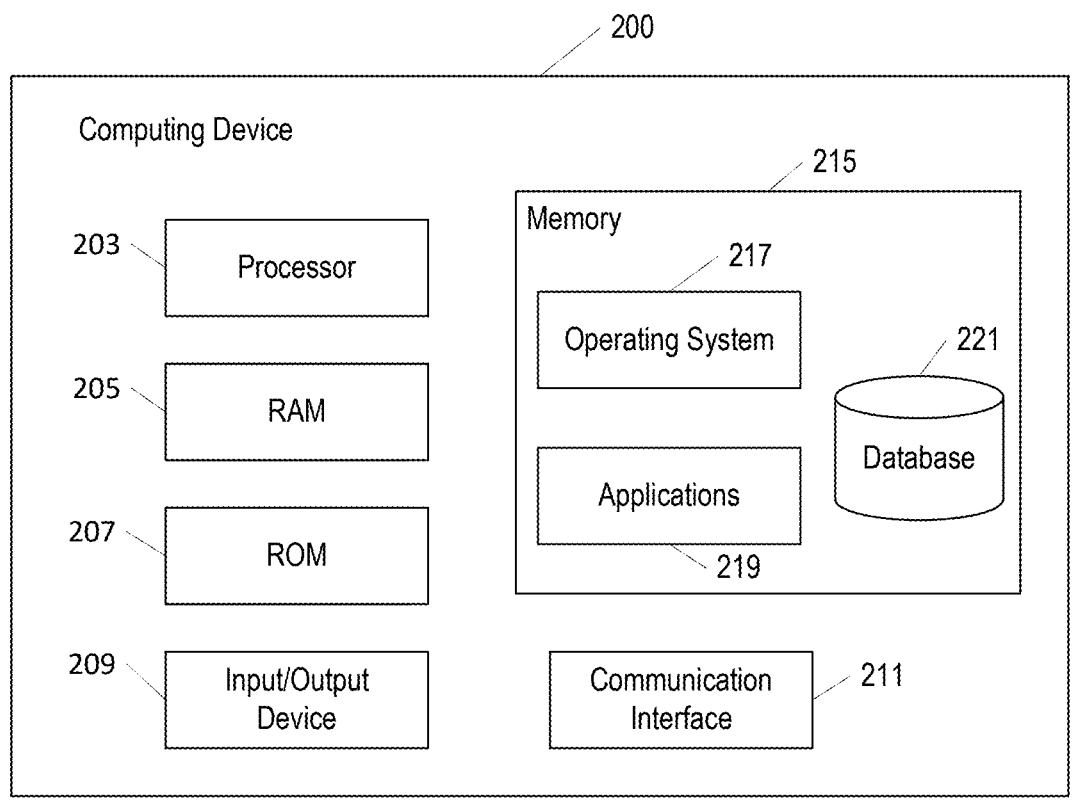
FIG. 2 shows an example computing device in accordance with one or more aspects described herein.

Turning now to FIG. 2, a computing device 200 that may be used with one or more of the computational systems is described. The computing device 200 may be the same or similar as any one of the computing devices 110, the virtual warehouse servers 130, and/or the data warehouses 120 of FIG. 1. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations.

In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Discussion will now turn to an example of how the computing devices of FIG. 1, such as the computing devices 110, the virtual warehouse servers 130, and the databases 120, may operate to fulfill a query by selecting one or more of a plurality of virtual warehouses.

Figure 3:
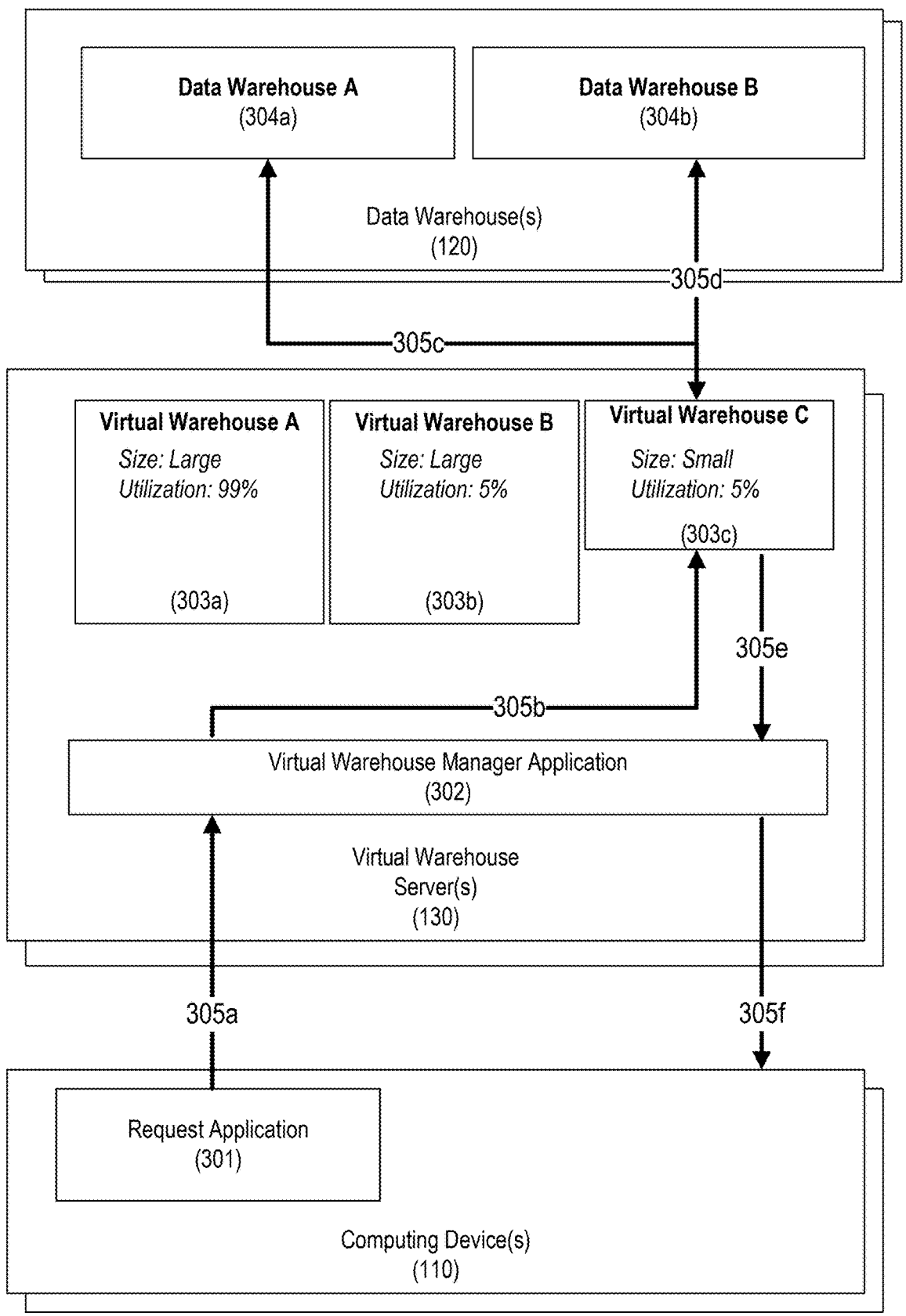
FIG. 3 depicts computing devices, virtual warehouse servers, and data warehouses working in conjunction to execute queries.

FIG. 3 shows a system comprising the computing devices 110, the virtual warehouse servers 130, and the data warehouses 120 of FIG. 1. FIG. 3 may depict all or portions of a system configured according to the Snowflake architecture or a similar architecture permitting use of one or more virtual warehouses. FIG. 3 also depicts various elements which may be portions of those computing devices, as well as transmissions between those devices. In particular, the computing devices 110 are shown having a request application 301, the virtual warehouse servers 130 are shown having a virtual warehouse manager application 302 and three virtual warehouses (a virtual warehouse A 303a, a virtual warehouse B 303b, and a virtual warehouse C 303c), and the data warehouses 120 are shown comprising a data warehouse A 304a and a data warehouse B 304b. All or portions of these devices may be part of the Snowflake architecture or another architecture. For example, the computing devices 110 may be users' personal computing devices, whereas the virtual warehouse servers 130 may be cloud servers managed by Snowflake Inc., of San Mateo, CA.

As part of step 305a, the request application 301 may transmit, to the virtual warehouse manager application 302, a request for a query. The transmitted request may be in a variety of formats which indicate a request for a query to be executed. For example, the request may comprise a structured query which may be directly executed on one or more of the data warehouses 120 (such as an SQL query), and/or may comprise a vaguer request for data (e.g., a natural language query, such as a request for "all data in the last month").

The request application 301 may be any type of application which may transmit a request to the virtual warehouse manager application 302, such as a web browser (e.g., showing a web page associated with the virtual warehouse manager application 302), a special-purpose query application (e.g., as part of a secure banking application, such as may execute on a tablet or smartphone), an e-mail application (e.g., such that the request to the virtual warehouse manager application 302 may be transmitted via e-mail), or the like. As such, the request may be input by a user in a user interface of the request application 301 and using, for example, a keyboard, a mouse, voice commands, a touchscreen, or the like.

As part of step 305b, the virtual warehouse manager application 302 may select one of a plurality of available virtual warehouses (in this case, the virtual warehouse C 303C) to execute the query. As part of this process, the virtual warehouse manager application may determine which of a plurality of virtual warehouses should address the request received in step 305. The virtual warehouse manager application 302 may identify an execution plan for the query by determining one or more sub-queries to be executed with respect to one or more of the data warehouses 120. For example, the request may comprise querying both the data warehouse A 304a and the data warehouse B 304b for different portions of data. The virtual warehouse manager application 302 may, based on the query and the execution plan, predict a processing complexity of the query. The processing complexity of the query may correspond to a time to complete the query (e.g., the time required to perform all steps of the execution plan), a quantity of computing resources (e.g., processor time, memory) required to execute the query, or the like. The virtual warehouse manager application 302 may additionally and/or alternatively determine an operating status of the plurality of virtual warehouses and/or processing capabilities of the plurality of virtual warehouses. For example, the virtual warehouse A 303a is shown as being large (e.g., having relatively significant processing capabilities) but having a utilization of 99% (that is, being quite busy), the virtual warehouse B 303b is shown as being large and having a utilization of 5% (that is, being quite free), and the virtual warehouse C 303c is shown as being small and having a utilization of 5%. Based on the processing complexity, the operating status of the plurality of virtual warehouses, and/or the processing capabilities of the plurality of virtual warehouses, a subset of the plurality of virtual warehouses may be selected. For example, that subset may comprise both the virtual warehouse B 303b and the virtual warehouse C 303c, at least because both have a low utilization rate and thus may be capable of handling the request received from the request application 301. From that subset, one or more virtual warehouses may be selected to execute the query. For example, as shown in the example provided in FIG. 3, the virtual warehouse C 303c has been selected to address the query. This may be because, for example, the query may be small (that is, the execution plan may be simple or otherwise quick to handle), such that executing the query on the virtual warehouse C 303c may be cheaper and may free up the virtual warehouse B 303b for handling larger, more complex queries.

Virtual warehouses, such as the virtual warehouse A 303a, the virtual warehouse B 303b, and/or the virtual warehouse C 303c, may comprise a respective set of computing resources. For example, each virtual warehouse may execute on one or a plurality of servers (e.g., the virtual warehouse servers 130), and each virtual warehouse may be apportioned a particular quantity of computing resources (e.g., computing processor speed, memory, storage space, bandwidth, or the like). Virtual warehouses may be resized such that, for example, the virtual warehouse A 303a (which is large) may be shrunk down to a smaller size to save money and/or to allocate resources to another virtual warehouse. Virtual warehouses may also have different utilization rates. For example, a virtual warehouse using substantially all of its resources to execute a query may be said to be fully occupied (that is, to have a utilization rate of approximately 100%), whereas a virtual warehouse not performing any tasks may be said to be free (that is, to have a utilization rate of approximately 0%). The size of the virtual warehouses may affect the utilization rate: for example, a larger virtual warehouse may be capable of handling more queries at the same time as compared to a relatively smaller virtual warehouse. Moreover, as indicated by the various steps described with respect to FIG. 3, virtual warehouses may be configured to execute one or more queries with respect to at least a portion of the data warehouses 120, collect results from the one or more queries, and provide, to one or more computing devices, access to the collected results. As such, the size and/or utilization of a particular virtual warehouse may impact its ability to execute queries, collect results, and provide those results.

Virtual warehouses, such as the virtual warehouse A 303a, the virtual warehouse B 303b, and/or the virtual warehouse C 303c, may be resized based on a schedule. For example, a single virtual warehouse (e.g., the virtual warehouse A 303a) might be resized based on a schedule specific to that virtual warehouse (and/or a group of virtual warehouses) such that it is larger during business hours (e.g., 9:00 AM to 5:00 PM) as compared to other hours. Such a schedule might be defined by an administrator, may be based on a use pattern specific to the virtual warehouse, and/or might be based on a pattern of activity, by one or more users, corresponding to one or more different virtual warehouses. For example, the virtual warehouse manager application 302 may monitor use of virtual warehouses and determine that, during business hours, the virtual warehouses are used more frequently. Based on such a determination, the virtual warehouse manager application 302 may configure one or more virtual warehouses with a schedule that causes those one or more virtual warehouses to be larger during business hours and smaller during non-business hours. This might advantageously save money for an organization: by dynamically scaling the size of virtual warehouses, needlessly large (and thereby needlessly expensive) virtual warehouses need not be maintained.

Though the virtual warehouse manager application 302 is shown as part of the virtual warehouse servers 130, the virtual warehouse manager application 302 may execute on a wide variety of computing devices. For example, the virtual warehouse manager application may execute on one or more of the computing devices 110, such as the same computing device 110 hosting the request application 301. As another example, the virtual warehouse manager application may execute on an entirely separate computing device. Because the virtual warehouse manager application 302 may perform steps above and beyond conventional virtual warehouse functionality, the application may execute on an entirely separate computing device and may interface with preexisting virtual warehouse systems, e.g., Snowflake.

As part of step 305c and 305d, the selected virtual warehouse (in this case, the virtual warehouse C 303c) may execute the query requested by the request application 301. As shown in FIG. 3, this entails querying both the data warehouse A 304a and the data warehouse B 304b. The data warehouses 120, such as the data warehouse A 304a and the data warehouse B 304b, need not be the same: for example, the data warehouse A 304a may have an entirely different format, may have entirely different schedules which affect their size at any given time, and may have an entirely different structure as compared to the data warehouse B 304b. For instance, the data warehouse A 304a may comprise a SQL database, whereas the data warehouse B 304b may comprise a file server which stores files according to the File Allocation Table (FAT) file system. As part of this process, the virtual warehouse C 303c may receive, store, and/or organize results from the data warehouses 120. For example, the virtual warehouse C 303c may receive query results from the data warehouse A 304a and the data warehouse B 304b, may store those results in memory, and then may encrypt those results for security purposes.

As part of step 305e, the virtual warehouse C 303c provides the collected results to the virtual warehouse manager application 302. Then, as part of step 305f, the virtual warehouse manager application 302 provides the results to one or more of the computing devices 110. This process is optional, as the virtual warehouse C 303c may, in some instances, provide the results directly to one or more of the computing devices 110. Moreover, the results need not be provided back to the request application 301: for example, the results may be provided to an entirely different computing device (e.g., such that the request may have been received from a smartphone but the results may be delivered to an associated laptop) and/or may be provided to an entirely different application (e.g., such that the request may have been received via the request application 301, but the results may be received by a separate application, such as a spreadsheet application, executing on one or more of the computing devices 110).

The steps depicted in FIG. 3 are illustrative, and represent simplified examples of processes which may be performed by the elements depicted in FIG. 3. For example, while step 305a is reflected as an arrow directly leading from the request application 301 to one or more of the virtual warehouse servers 130, the request may in fact be routed through various other computing devices as part of the network 140. As another example, the query process reflected in step 305c and step 305d may involve a plurality of different transmissions between the virtual warehouse C 303c and the data warehouses 120.

Discussion will now turn to steps which may be performed from the perspective of a computing device executing the virtual warehouse manager application 302.

Figure 4:
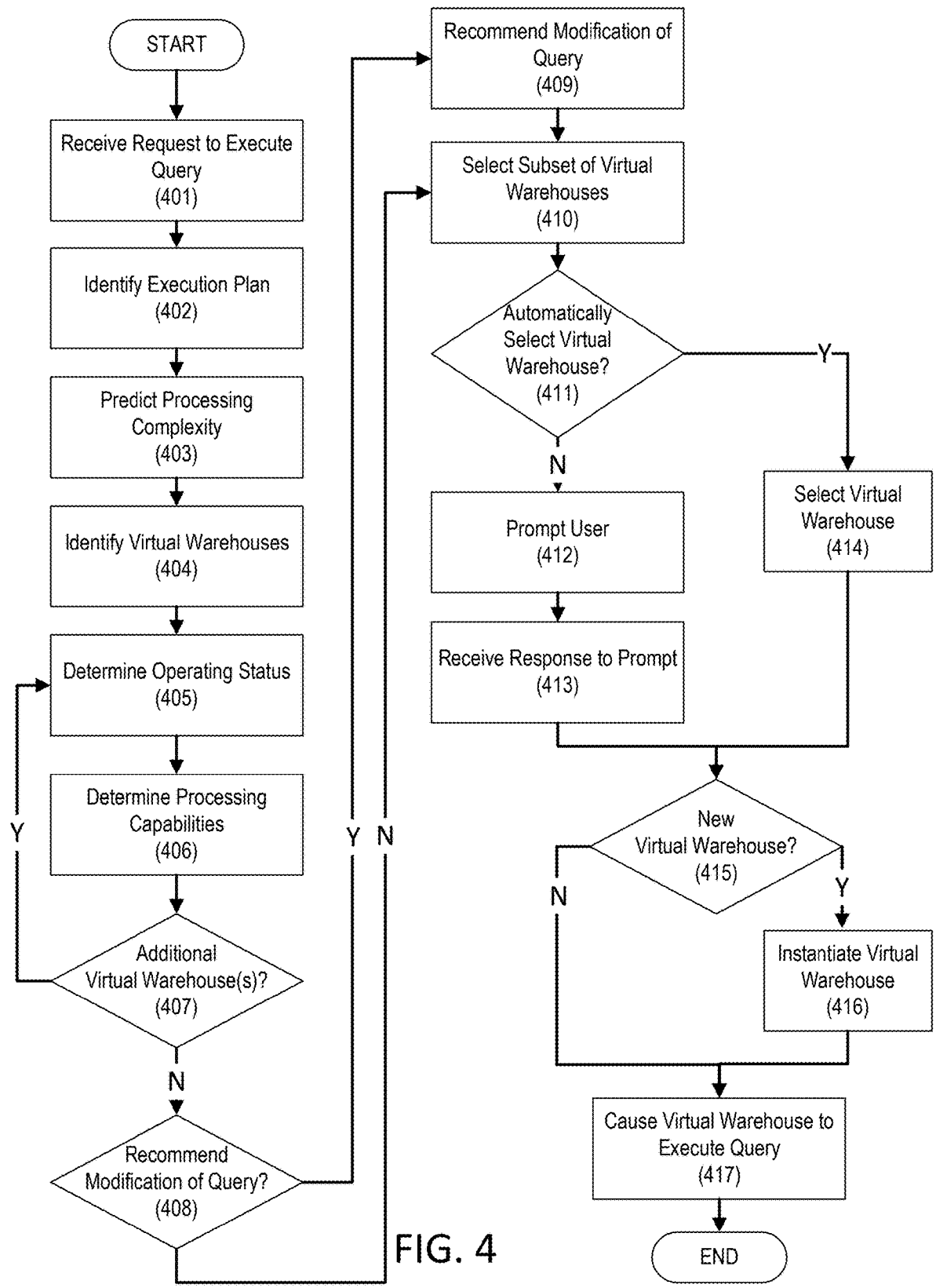
FIG. 4 shows a flow chart which may be performed to select, from a plurality of virtual warehouses, a virtual warehouse for execution of a query.

FIG. 4 depicts a flowchart with steps which may be performed by a computing device, such as one or more of the computing devices 110, the virtual warehouse servers 130, and/or the data warehouses 120. One or more non-transitory computer-readable media may store instructions that, when executed by one or more processors of a computing device, cause performance of one or more of the steps of FIG. 4. The steps depicted in FIG. 4 may operate on a Snowflake environment or other virtual warehouse environment, such that they may be performed by a computing device within or external to such an environment. For example, the steps depicted in FIG. 4 may be performed on a user device as part of the user device preparing a query for execution, such that changes need not be made to a preexisting virtual warehouse environment.

In step 401, the computing device may receive a request to execute a query. The request may be the same or similar as the request indicated in step 305a of FIG. 3. The request may indicate a query to be executed with respect to one or more data warehouses, such as the data warehouses 120. The request may be received from a user. The request may be associated with a priority, such as a priority of the query and/or a priority of the user. For example, as will be described in further detail below, high-priority queries and/or users may be capable of causing other queries executing on a virtual warehouse to be paused and/or cancelled.

In step 402, the computing device may identify an execution plan for the received query. The execution plan may comprise one or more sub-queries to be executed with respect to one or more of a plurality of data warehouses, such as the data warehouses 120. For example, the execution plan may comprise a series of twenty sub-queries which must be executed in sequence and by querying twenty different data warehouses. As another example, the execution plan may indicate that only one data warehouse need be queried, but indicate that the size of the data warehouse is large, such that the results will be voluminous (and time-consuming to receive). As such, the execution plan may describe steps which must be performed by a virtual warehouse to complete the request received in step 401. The execution plan may indicate other information about the received query, such as a predicted size of one or more data warehouses, a utilization rate of one or more data warehouses, a predicted size (e.g., in kilobytes) of the results to be provided by a data warehouse, or the like.

In step 403, the computing device may predict, based on the execution plan, a processing complexity. The predicted processing complexity may relate to a volume of data (e.g., how much data is predicted to be received in response to the query), a speed (e.g., how long a virtual warehouse of a particular size is predicted to take to fulfill the query), a complexity (e.g., a predicted speed of processor required to process results received by the query), or the like. The predicted processing complexity may thereby be an objective and/or subjective indication of the difficulty of the query received in step 401.

The computing device may use a trained machine learning model as part of predicting the processing complexity of the query. A machine learning model may be trained based on a history of queries executed by the plurality of data warehouses. The history of queries may comprise a history of queries provided to one or more data warehouses as well as results from those queries (e.g., in terms of processing time, bandwidth used, the size of the results, or the like). In this manner, the machine learning model may learn how various aspects of queries (e.g., tables queried, wildcards used, query terms used) affect the processing complexity of those queries. Then, the computing device may provide, as input to the trained machine learning model, the execution plan determined in step 402. As a result, the computing device may receive, from the trained machine learning model and based on the input, a prediction of the processing complexity of the query received in step 401.

The computing device may, as part of predicting the processing complexity of the query, determine a configuration of at least one table of a data warehouse. The way in which a data warehouse (e.g., one of the data warehouses 120) is configured may affect the processing complexity of a query (e.g., a sub-query) to that data warehouse. For example, if a table of a data warehouse is configured to contain a large quantity of columns, then that table may take longer to query than a table having a relatively fewer quantity of columns. As another example, an indexed table may be faster to query than a non-indexed table; however, that speed may be contingent on the query using indexed functionality of the table.

In step 404, the computing device may identify one or more virtual warehouses. The computing device may query one or more computing devices (e.g., one or more of the virtual warehouse servers 130) to determine one or more virtual warehouses. Additionally and/or alternatively, the computing device may maintain a list (e.g., a list predefined by an administrator) of virtual warehouses. Additionally and/or alternatively, the computing device may scan a network to detect one or more servers which are hosting, or may be caused to host, one or more virtual warehouses.

Step 405 through step 407 comprises a loop which may iterate through each of the virtual warehouses identified in step 404. The process here is shown as being performed for each virtual warehouse of the virtual warehouses identified in step 404; however, this need not be the case in all circumstances. For example, in some circumstances, a virtual server might not report back an operating status and/or processing capabilities (e.g., for security and/or privacy reasons), such that it may be omitted during step 405 through step 407.

In step 405, the computing device may determine an operating status for a virtual warehouse. The operating status may indicate any objective and/or subjective measurements of the utilization of a virtual warehouse. For example, the operating status may correspond to a degree of utilization of the virtual warehouse. For instance, the degree of utilization may indicate a percentage value corresponding to a quantity of computing resources, of the total quantity of computing resources available to a virtual warehouse, currently in use. Additionally and/or alternatively, the operating status may indicate a quantity of remaining computing resources available to a virtual warehouse, a time until the virtual warehouse is free for new queries, or the like. The operating status might indicate a size of the virtual warehouse with respect to a schedule that implements the size of the virtual warehouse. For example, an operating status might indicate that a virtual warehouse is currently large (e.g., has a large quantity of computing resources available for processing), but might shrink down to a smaller size (e.g., have fewer computing resources available) at a later time (e.g., after 5:00 PM).

In step 406, the computing device may determine processing capabilities for a virtual warehouse. Processing capabilities may indicate any objective and/or subjective indication of the ability of a virtual warehouse to perform a task. For example, the processing capabilities may correspond to a strength of one or more processors assigned to the virtual warehouse, a quantity of memory available to the virtual warehouse, storage space allocated to the virtual warehouse, bandwidth available to the virtual warehouse, or the like. The processing capabilities may thereby indicate how quickly a virtual warehouse may be capable of processing a query. The processing capabilities might correspond to a particular time, such as a period of time during which the virtual warehouse is configured, by a schedule, to remain the same or a similar size (and, e.g., have access to a particular set of resources). As such, the processing capabilities for a particular warehouse might be different at different times of day.

In step 407, the computing device may determine whether additional virtual computing devices, of those identified in step 404, should be considered. If so, the flow chart proceeds back to step 405. Otherwise, the flow chart proceeds to step 408. In this manner, the computing device may, if desired, iterate through each of the virtual warehouses identified in step 404 to determine, for each of the virtual warehouses, an operating status and/or processing capabilities.

In step 408, the computing device may determine whether to recommend that the user modify their requested query. If so, the flow chart may proceed to step 409. Otherwise, the flow chart may proceed to step 410.

The computing device may determine to recommend that the user modify their requested query based on determining that the query is likely to take a long time and/or otherwise consume a significant quantity of computing resources. In some instances, users may inadvertently request queries that take excessively long amounts of time and/or may require significant computing resources. In the context of virtual warehouses, this may run the risk of occupying virtual warehouses for undesirably long quantities of time, which could be costly and could prevent other users from executing queries on the same virtual warehouse. Accordingly, based on the processing complexity, the operating status of one or more virtual warehouses, and/or the processing capabilities of the one or more virtual warehouses satisfying a threshold (e.g., a threshold corresponding to a query taking longer than an hour or costing more than a hundred dollars), the computing device may decide to warn the user that their query will take a long time and/or be costly.

In step 409, based on determining to prompt the user to consider modifying their query, the computing device may cause display of a prompt recommending modification of the query received in step 401. The prompt may indicate a predicted time to complete the query, a predicted cost to complete the query, or a similar caution that the query may be complex and/or time-consuming. An example of this prompt is discussed below with respect to FIG. 7. As part of the recommendation, a user may be provided an opportunity to modify their query. For instance, the computing device may receive, from a user device and in response to the recommendation, a modification to the query. In the event that the modification to the query is received, the system may return to step 402 and determine a new execution plan for the modified query.

A trained machine learning model may be used to recommend a modification to a query. A machine learning model may be trained based on a history of queries and execution times for those queries. For example, a machine learning model may be provided a history of queries executed by one or more virtual warehouses, including indications of the content of the query as well as the amount of time one or more virtual warehouses took in fulfilling those queries. The trained machine learning model may be then provided, as input, the query received in step 401. In response, the trained machine learning model may provide, as output, an estimation of an amount of time that the input query will take to process by a virtual warehouse. Because virtual warehouses may vary in size (and, e.g., available computing resources), multiple machine learning models may be trained for different sizes of virtual warehouses, and/or a single machine learning model may be trained to provide output estimating a processing time for a variety of different virtual warehouses.

In step 410, the computing device may select a subset of the identified virtual warehouses. The subset of the identified virtual warehouses may correspond to virtual warehouses which are capable of executing the query, even if doing so might not be optimal. For example, the subset of the identified virtual warehouses may include a virtual warehouse that has an operating status indicating a 75% utilization rate, even if it may be preferable to avoid causing that warehouse to execute further queries. As another example, the subset of the identified virtual warehouses might not include a virtual warehouse having too few processing capabilities to handle the requested query (e.g., a quantity of memory too small to store the results of the query) and/or a virtual warehouse having an undesirable operating status (e.g., a 95% utilization rate). The selected subset of the identified virtual warehouses may be based on a particular time and/or time period. For example, the selected subset of the identified virtual warehouses might be selected based on the schedule of those virtual warehouses, such that different virtual warehouses might be selected for different times. In this manner, for instance, one virtual warehouse might be selected for the subset if a query is to be executed at 5:00 PM, whereas another virtual warehouse might be selected for the subset if the query might instead be executed at 6:00 PM. In this manner, if a query is to be delayed (e.g., at user election, as a cost-saving measure, or the like), a virtual warehouse might ultimately be selected based on the time when the query is to be executed.

The particular threshold for whether a virtual warehouse is included in the subset of virtual warehouses may be determined in a variety of ways. In some instances, the threshold for inclusion in the subset may be set by a user. For example, the user may specify that all virtual warehouses having an operating status indicating a utilization rate of over 75% should be excluded from the subset. Additionally and/or alternatively, whether a virtual warehouse may be included in the subset may be based on output from a machine learning algorithm. A machine learning algorithm may be trained based on a history of selections, by users, of virtual warehouses from a plurality of virtual warehouses. Based on that history, the trained machine learning algorithm may thereby learn which virtual warehouses are likely to be selected. Accordingly, as part of step 410, the trained machine learning algorithm may be provided input comprising indications of the virtual warehouses (including, if available, their respective operating statuses and processing capabilities). The computing device may then receive, as output, one or more virtual warehouses that should be included in the subset.

As part of selecting the subset of the plurality of virtual warehouses, the computing device may analyze the schedule of and/or historical operating status trends of at least a portion of the plurality of virtual warehouses. As virtual warehouses might have different sizes based on a schedule, a particular virtual warehouse might have a different size (e.g., different computing resources) at different times. In turn, as indicated above, different virtual warehouses might be selected at different times, and/or different virtual warehouses might be selected for different times when a query might be executed. Moreover, virtual warehouses may have a periodic utilization pattern. For example, virtual warehouses may be busy during business hours, but may be relatively under-utilized during other hours. Accordingly, the historical operating status trends of a virtual warehouse may indicate whether a virtual warehouse is likely to become more or less busy over time. In turn, as part of selecting the subset of the plurality of virtual warehouses, the computing device may determine a historical operating status trend of at least a portion of the plurality of virtual warehouses, and then select, based on the operating status of each of the plurality of virtual warehouses and based on the historical operating status trend, the subset of the plurality of virtual warehouses.

In step 411, the computing device may determine whether it should automatically select one of the subset of identified virtual warehouses. If not, the flowchart proceeds to step 412. If it should, the flowchart proceeds to step 414.

The decision as to whether to automatically select one of the subset of identified virtual warehouses may be based on a variety of factors, including user preferences, the processing complexity, the number and scope of the subset of the virtual warehouses, and the like. For example, a user may specify that, for small queries that are frequently requested throughout the day, the virtual warehouse should be automatically selected so that users are not forced to manually select a virtual warehouse for small and simple queries. As another example, if only one virtual warehouse is in the subset of virtual warehouses selected in step 410, then the selection may be automatic because the user need not make a choice. That said, as will be described further below, the user may be capable of instantiating a new virtual warehouse, so the presence of only one virtual warehouse in the subset need not mean that the choice should be automatically made for the user.

In step 412, if the computing device decided that it should not automatically select the virtual warehouse, the computing device may prompt the user with a notification regarding the subset of the plurality of virtual warehouses. The prompt may comprise a list of the subset of virtual warehouses. The prompt may allow a user to select one of the subset of virtual warehouses and/or, if desired, to instantiate a new virtual warehouse. The prompt may permit a user under certain circumstances to modify the size and/or other operating parameters of a virtual warehouse. For example, certain high-priority accounts may be permitted to increase the size of a virtual warehouse (e.g., in a manner which increases cost but allows the virtual warehouse to handle a particularly large query quickly), pause and/or cancel other queries executing in a virtual warehouse (e.g., to free up the virtual warehouse for a different query), or the like.

In step 413, the computing device may receive a response to the prompt. The response may select one of the subset of virtual warehouses and/or may indicate that a new virtual warehouse should be instantiated. The response may comprise one or more additional instructions, such as to modify the size and/or other operating parameters of a virtual warehouse, such as to pause and/or cancel one or more queries currently executing on the virtual warehouse.

In step 414, if the computing device decided to automatically select the virtual warehouse, the computing device may select one of the subset of the plurality of virtual warehouses. The decision regarding which virtual warehouse of the subset of virtual warehouses to select may be based on a number of considerations, including the processing complexity determined in step 403, the operating status of one or more virtual warehouses as determined in step 405, the processing capabilities of one or more virtual warehouses as determined in step 406, a priority of the query received and/or the priority of the user submitting the query, or the like. For example, virtual warehouses that are relatively free may be prioritized over virtual warehouses that are already busy.

As part of selecting a virtual warehouse, one or more operating parameters of the virtual warehouse may be modified. The virtual warehouse may be made larger or smaller (e.g., the virtual warehouse may be provided a greater quantity or lesser quantity of computing resources), the schedule of the virtual warehouse might be modified, one or more queries executing on a virtual warehouse may be modified (e.g., to cancel one or more queries already executing on a virtual warehouse), or the like. The modification of the one or more operating parameters of a virtual warehouse may be based on, for example, a determination that the virtual warehouse should be modified to better execute the query. For example, a virtual warehouse may have barely enough processing capabilities to handle a query, and the computing device may proactively modify the size of the virtual warehouse to add additional computing resources to ensure that unexpected hiccups and processing delays do not cause the query to execute for an undesirably long time.

Whether at user election (e.g., as part of step 413) or based on a decision by the computing device (e.g., as part of step 414), the modification of one or more operating parameters of a virtual warehouse may be effectuated by modifying the one or more servers (e.g., the virtual warehouse servers 130) providing the virtual warehouse. For example, modifying the operating parameters may comprise employing an entirely new server to act as a virtual warehouse server. This may be possible where, for example, the virtual warehouse servers 130 are part of a cloud computing service provider, where additional server resources may be purchased for an additional fee.

In step 415, the computing device may determine whether it should instantiate a new virtual warehouse. If the computing device determines to instantiate a new virtual warehouse, the flowchart proceeds to step 416. Otherwise, the flowchart proceeds to step 417.

The decision as to whether to instantiate a new virtual warehouse may be based on the response to the prompt received in step 413, a decision by the computing device as part of step 414, or the like. For example, if no virtual warehouses are capable of executing the query received in step 401 (e.g., such that the subset in step 410 is empty), the computing device may determine to instantiate a new virtual warehouse.

As one example of the process of instantiating a new virtual warehouse, as part of step 414, the computing device may determine, based on the processing complexity, the operating status of the plurality of virtual warehouses, and the processing capabilities of the plurality of virtual warehouses. For example, all virtual warehouses in the subset of the virtual warehouses may be very busy, such that it may be preferable to execute the query in an entirely new virtual warehouse. In turn, the answer to step 415 would be yes, and the flow chart would proceed to step 416.

In step 416, the computing device may instantiate a new virtual warehouse. Instantiating a new virtual warehouse may comprise causing one or more servers (e.g., one or more of the virtual warehouse servers 130) to instantiate a new virtual warehouse.

In step 417, the computing device may cause the virtual warehouse to execute the query indicated in the request received in step 401. As part of step 417, if the computing device (as part of step 414) and/or a user (as part of step 412 and 413) decided to modify one or more operating parameters of a virtual warehouse, then those modifications may be implemented. For example, based on the computing device determining, in step 414, to add additional computing resources to a virtual warehouse, then step 417 may comprise causing the server(s) providing that virtual warehouse to assign the virtual warehouse additional processing resources.

Causing the virtual warehouse to execute the query need not comprise causing the virtual warehouse to execute the query immediately. In some circumstances, such as where the virtual warehouse is particularly busy, where the virtual warehouse might become bigger and/or smaller at a later time based on a schedule, and/or where immediate execution would be costly, the computing device may cause the virtual warehouse to execute the query at a later time. For example, the computing device may determine a first cost associated with execution of the query by a first virtual warehouse, then determine a time period such that, during the time period, execution of the query by the first virtual warehouse is associated with a second cost lower than the first cost. In this manner, the computing device may determine a time when the query may be delayed to save money. The computing device may then cause the first virtual warehouse to execute the query during the time period. The computing device may cause the query to be executed by a virtual warehouse at a later time for a plethora of other reasons, such as the operating status of the virtual warehouse. For example, if the selected virtual warehouse has a current utilization rate of 95%, then the computing device may wait until the selected virtual warehouse is freer before causing the selected virtual warehouse to execute the query. As part of this delay process, a user may be prompted as to whether to delay their query and/or cancel their query. In that manner, the user might not be left guessing as to why their results are taking an unusually long time to collect.

The computing device may additionally and/or alternatively dynamically alter the size of (e.g., the computing resources available to) a virtual warehouse at any point during the process depicted in FIG. 4. For example, the computing device may determine a time period associated with a low frequency of queries, and then modify, during the time period, a size of the plurality of virtual warehouses. In this manner, the computing device may dynamically configure the size of virtual warehouses, in effect preventing them from remaining unnecessarily large. This may have particular cost savings in environments where the size of a virtual warehouse corresponds to a particular cost. For instance, keeping a relatively costly virtual warehouse operational during non-business hours may incur a large unnecessary cost.

As part of causing the virtual warehouse to execute the query, the query may be tagged or otherwise associated with a user and/or a department of an organization. As will be described in further detail below with respect to FIG. 6, it may be desirable to track the use of virtual warehouses in order to monitor the costs associated with the operation of those virtual warehouses. Tagging the query may comprise, for example, causing an indication of a user and/or organization to be stored by the virtual warehouse, put in the results of the virtual warehouse, stored in a separate data warehouse (e.g., a data warehouse configured to track use of one or more virtual warehouses), or the like. For example, an indication of an organization may be placed in the comments field of metadata associated with the query sent to the virtual warehouse, such that the metadata is stored as part of execution of the virtual warehouse.

FIG. 5A depicts an execution plan 500 as a table with four columns and six rows, including a header row. The step column 501 indicates the number of a step for each row of the plurality of rows. The task column 502 indicates a task to be performed by a virtual warehouse (e.g., one of the virtual warehouses shown in FIG. 3) with respect to one or more data warehouses (e.g., one or more of the data warehouses 120). The database size column 503 provides an indication of a size of the data warehouse(s) being queried, such as the size of a table being queried. The estimated results size column 504 indicates an estimation as to the size of results received from the task indicated in the task column 502. These columns are illustrative, and reflect various aspects of data which may be provided in an execution plan. For example, other execution plans may omit the estimated results size column 504.

The first row 505a indicates a first step wherein the virtual warehouse is tasked with querying Table 1 of Data Warehouse A. As indicated by the first row 505a, the database size of Table 1 of Data Warehouse A is 5 GB, and the estimated results size is 2 GB.

The second row 505b indicates a second step wherein the virtual warehouse is tasked with querying Table 2 of Data Warehouse A using results from the first step (that is, the results from the first row 505a). As indicated by the second row 505b, the database size of Table 2 of Data Warehouse A is 15 GB, and the estimated results size is 1 GB.

The third row 505c indicates a third step wherein the virtual warehouse is tasked with querying Table 1 of Data Warehouse B using results from the second step (that is, the results from the second row 505b). As indicated by the third row 505c, the database size of Table 1 of Data Warehouse B is 1 GB, and the estimated results size is 20 MB.

The fourth row 505d indicates a fourth step wherein the virtual warehouse is tasked with querying Table 2 of Data Warehouse B. Unlike the steps indicated by the second row 505b and the third row 505c, the query indicated in the fourth row 505d is not dependent on output from previous steps. As indicated by the fourth row 505d, the database size of Table 2 of Data Warehouse B is 10 GB, and the estimated results size is 5 GB.

The fourth row 505d illustrates that, in some circumstances, steps in an execution plan, such as the execution plan 500, might not be dependent on the completion of other steps. Such independent steps may be performed out-of-order if desired. For example, for efficiency purposes, a virtual warehouse may simultaneously perform steps 1 and step 4 of the execution plan 500, then perform steps 2 and 3 in sequence. As another example, based on determining that Data Warehouse A is busy, a virtual warehouse may perform step 4 first, then perform steps 1 through 3 in sequence.

The fifth row 505e indicates a fifth step wherein the virtual warehouse is tasked with assembling the results from steps 1-4. This step may comprise, for example, discarding unnecessary data received as parts of steps 1-4 and collecting all relevant data into a results table.

The processing complexity of a query may be determined using an execution plan, such as the execution plan 500, based on the size of various data warehouses to be queried. For example, the execution plan 500 shows that, in total, 31 GB of data warehouse content is to be queried, resulting in a total of over 8 GB of results (filtered, in step 5, to 7 GB of results). This may suggest a relatively high amount of processing complexity: for example, if a typical virtual warehouse is only allocated 2 GB of random access memory, then as part of implementing the execution plan 500, it may have to repeatedly move content from random access memory to longer-term storage (e.g., a hard drive) before retrieving more content. As another example, if a virtual warehouse is only allocated 1 MB/s of download bandwidth, then it may take an undesirably long time to retrieve results as part of the execution plan 500. As yet another example, if step 5 involves particularly complicated data operations (e.g., encrypting portions of the data using an advanced algorithm), then a virtual warehouse assigned a relatively weak processor may take an undesirably long amount of time to perform the execution plan 500.

FIG. 5B depicts a second execution plan 506, which provides additional operational detail about how the execution plan may be performed. As an example, the second execution plan 506 shows steps such as "TableScan," "Filter," "LeftOuterJoin," and other discrete steps which may be performed as part of querying a data warehouse. As with the execution plan 500, the second execution plan 506 also indicates a number of partitions for each step (both in total and assigned), as well as a number of bytes assigned. As with the execution plan 500, this information in the second execution plan 506 may be used to predict a processing complexity of the second execution plan 506.

FIG. 6 depicts a user interface 600 indicating the use of virtual warehouses by different departments of an organization. As an organization may pay another organization to host virtual warehouses on their behalf, the use of those virtual warehouses (e.g., over time, or to process certain quantities of data) may incur cost. For example, an organization may pay ten dollars for every gigabyte of data processed by a virtual warehouse, and/or may pay five dollars for every ten minutes that a virtual warehouse is used. This can be risky for an organization, as ill-formatted queries, forgetful employees, or other errors may cause the organization to incur significant costs. As such, the organization may, as part of the process depicted in FIG. 3, simultaneously track organizational use of virtual warehouses, thereby being able to determine which portion(s) of the organization incur certain costs. This can not only be useful for accounting purposes, but can also allow the organization to diagnose over-use and/or mis-use of those virtual warehouses.

The user interface 600 comprises three rows: a first row 601a, a second row 601b, and a third row 601c. The first row 601a indicates that Department A used 5 TB of data over 30 hours, and incurred $500 in costs. The second row 601b indicates that Department B used 15 TB of data over 50 hours, and incurred $1,500 in costs. The third row 601c indicates that Department C used 150 TB of data over 50 hours, and incurred $20,000 in costs. The costs indicated in the third row 601*c* may be undesirable, particularly given that they are multiple times the costs incurred by other departments. Accordingly, these costs may indicate, for example, that one or more employees in Department C are routinely executing poorly-formatted queries.

The user interface 600 may include other information about the use of virtual warehouses. For example, the user interface 600 may track instances in which query alerts (e.g., as part of steps 408 and 409 of FIG. 4) were generated. In this manner, an administrator may be able to learn if certain organizations were struggling to format proper queries. As another example, the user interface 600 may provide a detailed breakdown of data storage needs and costs, such as the costs associated with data storage, data replication, data transfer, or the like. The user interface 600 may additionally and/or alternatively track, in real-time, queries currently executing on one or more virtual warehouses. In this manner, an administrator may be able to see a current operating status of the virtual warehouses, as well as a cumulative cost of such operation. The user interface 600 may additionally and/or alternatively indicate, inter alia, release history information, changes in pricing, or the like.

FIG. 7 depicts a user interface 700 showing a warning regarding the cost of executing, using a virtual warehouse, a query. The user interface 700 may be the same or similar as the prompts described with respect to step 408 and 409 of FIG. 4. The user interface 700 warns a user that a submitted query may take an unusually long amount of time (3 hours) and may cost the organization a large amount of money ($5,000). Such a warning may be based on, for example, the processing complexity discussed with respect to step 403 of FIG. 4. For example, a computing device may determine, based on the processing complexity, that a query is likely to take three hours to complete, then use information about applicable contracts to determine that executing the query for three hours would cost the organization approximately $5,000. The user is provided three options: a first option 701*a* to continue with the query (and to, e.g., incur the time/financial costs), a second option 701*b* to request alternative query options (e.g., a recommendation of a reformatted query that would take less time and cost less money), and a third option 701*c* to cancel the query.

The second option 701*b* indicates that a user may be provided alternative query recommendations. The recommendation provided in response to the second option 701*b* may be the same or similar as the recommendation provided as part of step 409 of FIG. 4. In response to a selection of this option, a user may be provided one or more options for reducing the processing complexity of their query. For example, the user may be encouraged to replace one or more wildcard symbols with indications of specific sets of data to be collected/queried. As another example, the user may be encouraged to remove one or more portions of the query.

Discussion will now turn to how the user interfaces portrayed in FIG. 6 and FIG. 7 may be generated and provided. In particular, discussion will turn to ways in which information about organizational use of virtual warehouses may be collected and monitored, as well as how query notifications may be generated, output, and used as part of the execution of queries.

Figure 8:
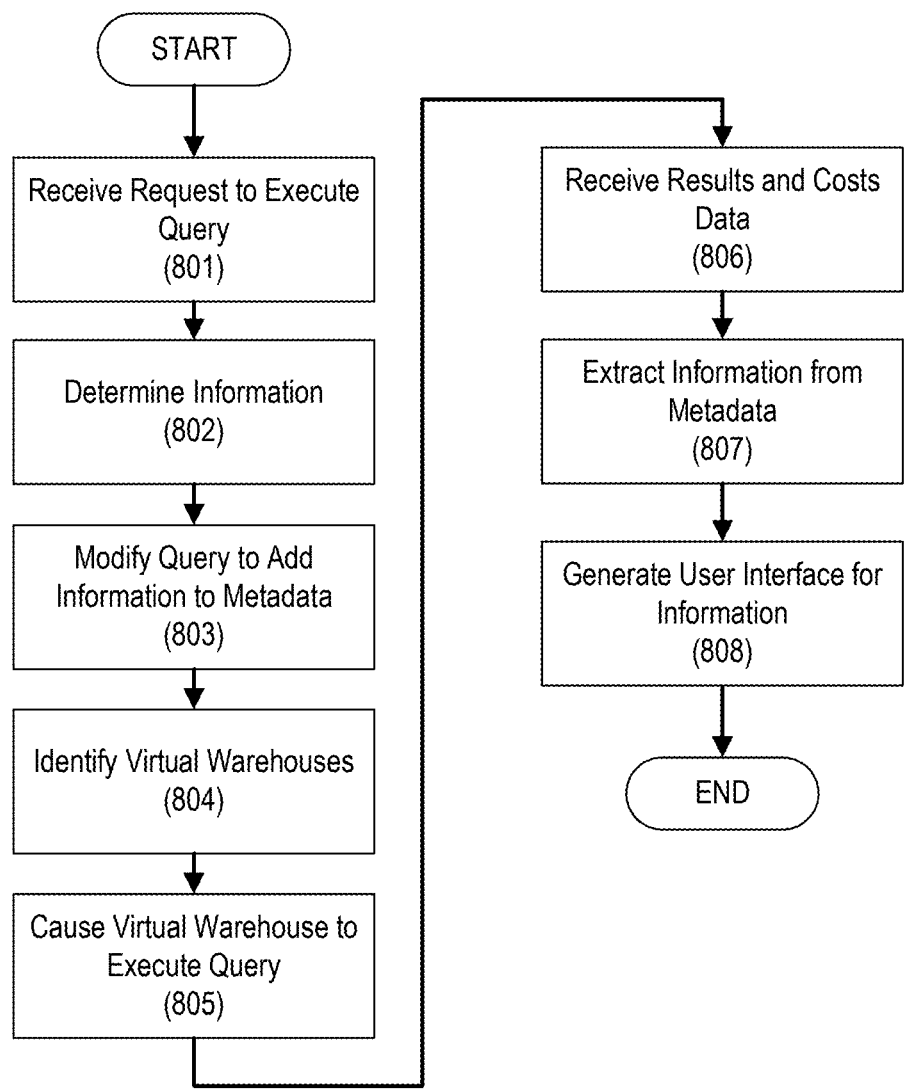
FIG. 8 shows a flow chart which may be performed to summarize organizational use of virtual warehouses.

FIG. 8 shows a flow chart which may be performed to summarize costs associated with the execution of queries. For instance, the process described with respect to FIG. 8 may result in a summary of costs for various organizations, such as is depicted in FIG. 6. The process shown in FIG. 8 is illustrative, and may be modified as desired. For example, one or more steps described with respect to FIG. 4 may be added to the process shown in FIG. 8, and/or one or more steps may be rearranged and/or omitted.

Step 801, which relates to receiving a request to execute a query, may be the same or similar as step 401 of FIG. 4.

In step 802, information associated with the request to execute the query may be determined. Such information might comprise, for instance, an organization associated with a user, an application used by the user, or the like. For example, if the request is received for a particular user, a user database may be queried to determine one or more organizations, sub-organizations, teams or the like associated with that user. As another example, user credentials provided by the user as part of requesting execution of the query may indicate one or more applications used by that user.

The information determined in step 802 may be used to determine responsibility for covering some or all costs associated with queries. For example, in a large enterprise, different departments may be tasked with budgeting for queries executed using virtual warehouses. As such, the determination of the information in step 802 may allow for the proper tracking of such queries, particularly in the complex virtual warehouse environment described herein. Though described as an organization, an organization need not be a discrete corporate entity: for example, the organization may be a portion of an entity, such as a department or division of a company, a product team of the company, an office of a multi-national corporation, a research team of a university, or the like.

In step 803, the query may be modified to add an indication of the information determined in step 802. This step may comprise modifying metadata of the query to add the information. For example, as part of providing a query to one or more virtual warehouses, the query may have one or more fields. While some of those fields may comprise substantive information about the query, other (e.g., a comments field) may allow users to freely provide comments. Using a metadata field, such as a comments field, to store this information may ensure that the query can be processed normally, but the information may be preserved during processing (and, e.g., retrieved later as part of query results).

Step 804, which relates to identifying virtual warehouses, may be the same or similar as step 404 of FIG. 4.

Step 805, which relates to causing a virtual warehouse to execute the query, may be the same or similar as step 417 of FIG. 4. Note that the process shown in FIG. 8 is simplified, and many of the steps of FIG. 4 may be performed. For example, any one of steps 408-416 may be performed before step 805.

In step 806, query results and costs data may be retrieved. Query results may be any results from the query executed by the virtual warehouse in step 805. For example, the query results may comprise one or more rows of data. That said, the query results need not be data directly responsive to the query. For example, if the query received in step 801 is malformed, then the query results may comprise an error message. The costs data may be any indication of the cost of execution of the query, whether denominated in terms of monetary value, time (e.g., processing time), processing complexity, or the like. For instance, the costs data may comprise a dollar figure (e.g., that a query cost a thousand dollars to execute), a processing time (e.g., that a query took an hour to execute), a combination of cost and time (e.g., that a query took an hour to execute and that every hour of processing time costs twenty dollars), a quantity of data (e.g., that a query caused retrieval of twenty terabytes of information and that every terabyte of information is associated with a dollar charge), or the like.

In step 807, the information from step 802 may be extracted from metadata of the query results. The query results may comprise one or more fields from the query, such as metadata indicated by the query. For example, the query results may comprise the same comments field as provided as a comments field for the modified query described in step 803. As such, extracting the organization may comprise locating the organization data (e.g., a unique organizational identifier) in the comments field of the query results.

In step 808, a user interface comprising query cost information corresponding to the information may be generated. The user interface may be generated based on the costs data and/or the extracted information in the metadata field of the query results. Such a user interface may be the same or similar as the user interface 600 of FIG. 6. This may advantageously allow analysis of the costs of, for example, various organizations' query activity, even when that activity is distributed across a wide variety of virtual warehouses.

The user interface may be provided in a variety of ways. The user interface may comprise a table with rows corresponding to information (e.g., organizations, applications) and query cost information, such as is depicted by the user interface 600 of FIG. 6. The user interface may additionally and/or alternatively comprise a chart and/or other graphic representing such information. Based on one or more portions of the query cost information satisfying a threshold, the user interface may be modified. For example, if query cost information for a particular organization satisfies a threshold, it may be colored red and bolded to catch the attention of the viewer. The user interface may thereby comprise a report of query costs, associated with information, over a period of time. For example, the user interface may comprise aggregated query cost information for a plurality of different organizations. In this manner, a user may be able to deduce which portion of an aggregated query cost is attributable to a particular organization.

Figure 9:
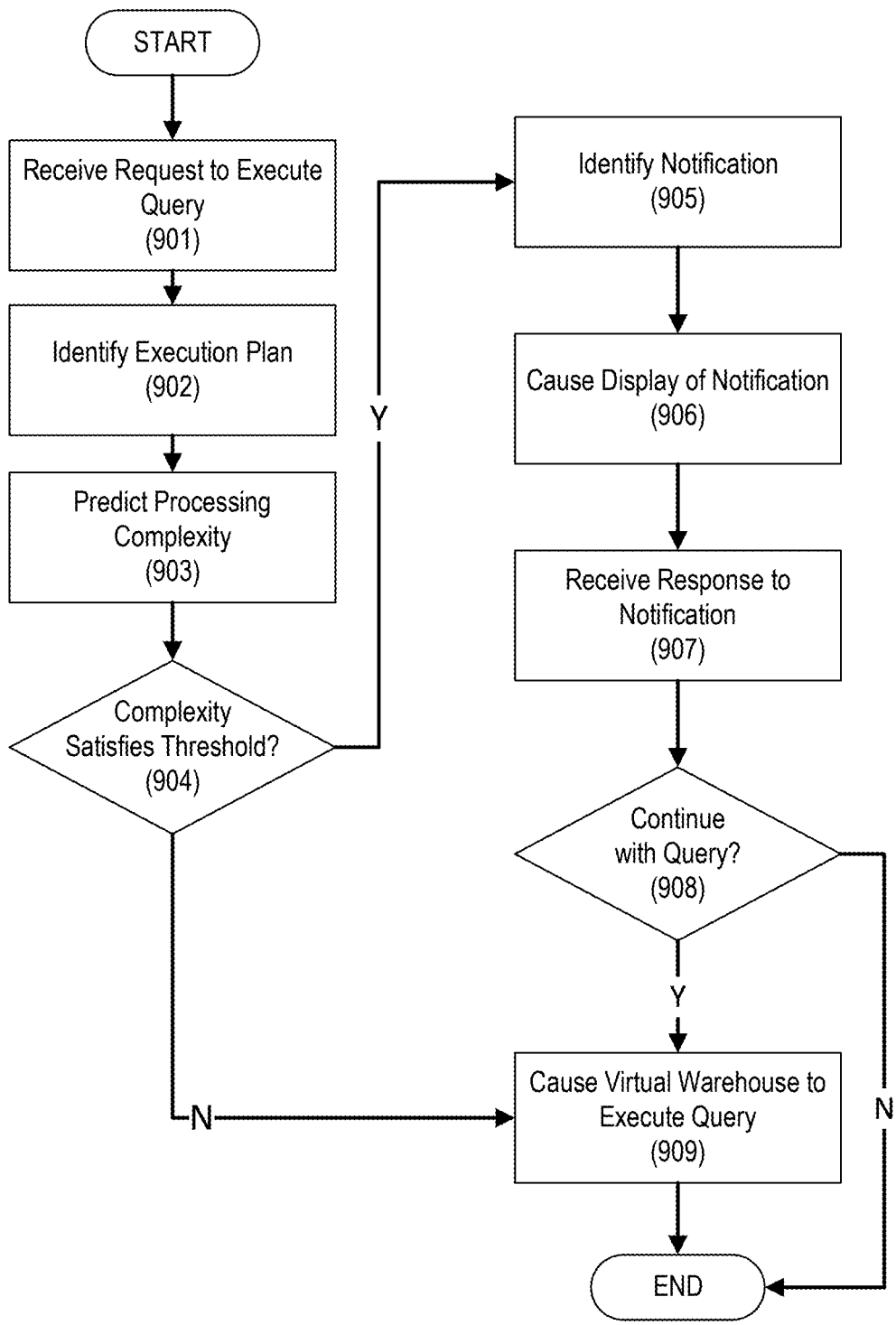
FIG. 9 shows a flow chart which may be performed to provide notifications to users regarding requested queries.

FIG. 9 shows a flow chart which may be performed to provide notifications regarding queries. For instance, the process described with respect to FIG. 9 may result in an alert regarding the cost of a query, the processing time of a query, the scope of a query, and/or the difficulty of a query, as illustrated by the user interface 700 of FIG. 7. The process shown in FIG. 9 is illustrative, and may be modified as desired. For example, one or more steps described with respect to FIG. 4 may be added to the process shown in FIG. 9, and/or one or more steps may be rearranged and/or omitted.

Steps 901-903 may be the same or similar as steps 401-403 of FIG. 4. That said, as indicated with respect to both FIG. 9 and FIG. 4, these steps may be re-arranged, omitted, or otherwise modified as desired.

In step 904, the computing device may determine whether the predicted processing complexity satisfies a threshold. The threshold may correspond to a long processing time, a particularly expensive quantity of processing resources, or the like. Such a threshold may be the same or similar as the threshold discussed with respect to step 408 of FIG. 4. If the answer to step 904 is yes, the flow chart proceeds to step 905. Otherwise, the flow chart proceeds to step 909.

In step 905, a notification may be generated. The notification may relate to the query (e.g., may relate to execution of the query, whether before execution of the query, during execution of the query, or after execution of the query). For example, the notification may relate to a processing time for the query, a cost of the query, a complexity of the query, an amount of data that may be processed and/or collected based on the query, or the like. In this manner, the notification may comprise a warning that the query is malformed, potentially overly broad, overly costly, overly complicated, or the like. The notification may be based on the predicted processing complexity, the operating status, and/or the processing capabilities. For example, the notification may indicate that the predicted processing complexity is unexpectedly high, such that the query will take a long time to execute. As another example, the notification may indicate that all operating statuses for all available virtual warehouse indicates that they are busy, such that the query may execute slowly (and/or such that the user should request that a new virtual warehouse be instantiated, as discussed with respect to steps 415-416 of FIG. 4). As another example, the notification may indicate that the processing capabilities of all available virtual warehouses are quite limited, such that the query may execute slowly (and/or such that the user should request that a new virtual warehouse be instantiated on an entirely new server, as discussed with respect to steps 415-416 of FIG. 4). An example of such a notification is provided in FIG. 7.

The notification may comprise one or more recommendations for modifying the query. As such, the notification may be the same or similar as the recommendation discussed in steps 408-409 of FIG. 4. For example, if a user inadvertently used a number of wildcard characters in a query, then the notification may recommend that the user remove one or more wildcards because they would result in an undesirable amount of data collected. As another example, if a user misspelled a column name, the notification may prompt the user to correct the misspelling.

In step 906, display of the notification may be caused. The notification may be displayed by a user device, such as one of the computing devices 110. The notification may comprise a pop-up notification, a message in a log, or the like.

In step 907, a response to the notification may be received. The response may be received from a user device, such as one of the computing devices 110. Examples of such responses are provided in FIG. 7. For example, a user may accept the notification and proceed with the query anyway, allowing it to process. As part of accepting the query, the user may select one of a plurality of different virtual warehouses for executing the query. In such an example, the query may process undesirably slowly, but the user may accept this strategy. The user may instead accept a query recommendation, such as accepting a proposed change to their query. Additionally and/or alternatively, the user may be provided an opportunity to go back and manually modify their query. The user may instead decide to entirely cancel the query.

In step 908, the computing device may determine whether to continue with the query. This decision may be based on the response received in step 907. For example, if a user has decided to cancel the query based on the notification, the computing device should not continue. Alternatively, if the user has decided to proceed with the query, and/or if the user has provided a modification to the query, the query should proceed. If the answer to step 908 is yes, the flow chart proceeds to step 909. Otherwise, the flow chart ends.

In step 909, a virtual warehouse may be caused to execute the query. This may be the same or similar as step 417 of FIG. 4. If the user selected a virtual warehouse as part of the response in step 907, then the virtual warehouse executing the query as part of step 909 may be the selected warehouse. If the user has provided a modification to the query (e.g., as part of the response received in step 907), the query executed in step 909 may be based on the modification.

As part of allowing a user to select a virtual warehouse and proceed with a query in steps 905-909, a log record of use of the virtual warehouse may be generated. In this manner, the use of virtual warehouses that may be undesirably costly or complex may be logged and monitored.

Steps 905-907 of FIG. 9 are shown as occurring before execution of the query is performed in step 909: however, these steps may be rearranged as desired. As indicated above, a notification may be provided before a query is executed, during execution of a query, or after a query has executed. Accordingly, steps 905-907 might be performed before a virtual warehouse executes a query (e.g., as shown in FIG. 9) and/or may be performed during or after execution of the query.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device comprising:
   one or more processors; and
   memory storing instructions that, when executed by the one or more processors, cause the computing device to:
   receive, from a user device, a request to execute a query on at least one of a plurality of data warehouses;
   modify the query by adding, to a metadata field of the query, information that identifies a user of the user device;
   identify a plurality of virtual warehouses, wherein each of the plurality of virtual warehouses comprises a respective set of computing resources configured to:
      execute one or more queries with respect to at least a portion of the plurality of data warehouses;
      collect results from the one or more queries; and
      provide, to the user device, access to the collected results;
   select a first virtual warehouse of the plurality of virtual warehouses based on one or more of:
      an operating status of the plurality of virtual warehouses,
      processing capabilities of the plurality of virtual warehouses, or
      a predicted processing complexity of the query;
   cause the first virtual warehouse to execute the query;
   receive, based on execution of the query by the first virtual warehouse:
      query results that comprise the metadata field; and
      costs data;
   extract the information that identifies the user of the user device from the metadata field in the query results; and
   output, based on the costs data and the extracted information in the metadata field of the query results, query cost information corresponding to the information.

2. The computing device of claim 1, wherein the instructions, when executed by the one or more processors, further cause the computing device to:
   identify an execution plan for the query by determining one or more sub-queries to be executed with respect to one or more of the plurality of data warehouses; and
   determine, based on the query and the execution plan, the predicted processing complexity of the query.

3. The computing device of claim 1, wherein the costs data corresponds to a quantity of data processed by the first virtual warehouse.

4. The computing device of claim 1, wherein the costs data corresponds to a time period during which the first virtual warehouse executed the query.

5. The computing device of claim 1, wherein the output query cost information comprises a report of query costs, associated with the information, over a period of time.

6. The computing device of claim 1, wherein the output query cost information comprises an indication of aggregated query cost information for a plurality of different organizations.

7. The computing device of claim 1, wherein the query cost information is based on a size of the first virtual warehouse.

8. A method comprising:
   receiving, from a user device, a request to execute a query on at least one of a plurality of data warehouses;
   modifying the query by adding, to a metadata field of the query, information that identifies a user of the user device;
   identifying a plurality of virtual warehouses, wherein each of the plurality of virtual warehouses comprises a respective set of computing resources configured to:
      execute one or more queries with respect to at least a portion of the plurality of data warehouses;
      collect results from the one or more queries; and
      provide, to the user device, access to the collected results;
   selecting a first virtual warehouse of the plurality of virtual warehouses based on one or more of:

an operating status of the plurality of virtual warehouses,
processing capabilities of the plurality of virtual warehouses, or
a predicted processing complexity of the query;
causing the first virtual warehouse to execute the query;
receiving, based on execution of the query by the first virtual warehouse:
query results that comprise the metadata field; and
costs data;
extracting the information that identifies the user of the user device from the metadata field in the query results; and
outputting, based on the costs data and the extracted information in the metadata field of the query results, query cost information corresponding to the information.

9. The method of claim 8, further comprising:
identifying an execution plan for the query by determining one or more sub-queries to be executed with respect to one or more of the plurality of data warehouses; and
determine, based on the query and the execution plan, the predicted processing complexity of the query.

10. The method of claim 8, wherein the costs data corresponds to a quantity of data processed by the first virtual warehouse.

11. The method of claim 8, wherein the costs data corresponds to a time period during which the first virtual warehouse executed the query.

12. The method of claim 8, wherein output query cost information comprises a report of query costs, associated with the information, over a period of time.

13. The method of claim 8, wherein the output query cost information comprises an indication of aggregated query cost information for a plurality of different organizations.

14. The method of claim 8, wherein the query cost information is based on a size of the first virtual warehouse.

15. One or more non-transitory computer-readable media storing instructions that, when executed by one or more processors, cause a computing device to:
receive, from a user device, a request to execute a query on at least one of a plurality of data warehouses;
modify the query by adding, to a metadata field of the query, information that identifies a user of the user device;
identify a plurality of virtual warehouses, wherein each of the plurality of virtual warehouses comprises a respective set of computing resources configured to:
execute one or more queries with respect to at least a portion of the plurality of data warehouses;
collect results from the one or more queries; and
provide, to the user device, access to the collected results;
select a first virtual warehouse of the plurality of virtual warehouses based on one or more of:
an operating status of the plurality of virtual warehouses,
processing capabilities of the plurality of virtual warehouses, or
a predicted processing complexity of the query;
cause the first virtual warehouse to execute the query;
receive, based on execution of the query by the first virtual warehouse:
query results that comprise the metadata field; and
costs data;
extract the information that identifies the user of the user device from the metadata field in the query results; and
output, based on the costs data and the extracted information in the metadata field of the query results, query cost information corresponding to the information.

16. The computer-readable media of claim 15, wherein the instructions, when executed by the one or more processors, further cause the computing device to:
identify an execution plan for the query by determining one or more sub-queries to be executed with respect to one or more of the plurality of data warehouses; and
determine, based on the query and the execution plan, the predicted processing complexity of the query.

17. The computer-readable media of claim 15, wherein the costs data corresponds to a quantity of data processed by the first virtual warehouse.

18. The computer-readable media of claim 15, wherein the costs data corresponds to a time period during which the first virtual warehouse executed the query.

19. The computer-readable media of claim 15, wherein the output query cost information comprises a report of query costs, associated with the information, over a period of time.

20. The computer-readable media of claim 15, wherein the output query cost information comprises an indication of aggregated query cost information for a plurality of different organizations.

* * * * *